US006171084B1

United States Patent
Wallis et al.

(10) Patent No.: US 6,171,084 B1
(45) Date of Patent: Jan. 9, 2001

(54) DISCHARGE VALVE

(75) Inventors: Frank S. Wallis; Walter T. Grassbaugh, both of Sidney; William Christian Gates, West Milton; Jeffrey L. Berning; Clyde C. Verhoff, both of Fort Loramie; Norman G. Beck, Sidney, all of OH (US)

(73) Assignee: Copeland Corporation, Sidney, OH (US)

( * ) Notice: Under 35 U.S.C. 154(b), the term of this patent shall be extended for 0 days.

(21) Appl. No.: 09/237,692

(22) Filed: Jan. 26, 1999

(51) Int. Cl.[7] ........................................ F01C 1/02
(52) U.S. Cl. .................. 418/55.1; 418/270; 417/902; 137/528; 137/512.1; 137/516.15
(58) Field of Search .................... 418/55.1, 270; 417/902; 137/528, 512.1, 516.15

(56) References Cited

U.S. PATENT DOCUMENTS

| | | |
|---|---|---|
| 550,730 | 12/1895 | Stone . |
| 1,359,006 | 11/1920 | Wardwell . |
| 1,593,519 | 7/1926 | Underwood . |
| 2,506,306 * | 5/1950 | Mantle ........................ 137/516.15 |
| 2,599,898 * | 6/1952 | Dalrymple ........................ 137/528 |
| 2,646,071 | 7/1953 | Wagner . |
| 2,908,109 | 10/1959 | Rotwein . |
| 3,060,959 | 10/1962 | Foster . |
| 3,176,712 | 4/1965 | Ramsden . |
| 3,790,311 | 2/1974 | Butts et al. . |
| 4,277,955 | 7/1981 | Parker . |
| 4,369,808 | 1/1983 | Hagman . |
| 4,369,812 | 1/1983 | Paradis et al. . |
| 4,431,388 | 2/1984 | Eber et al. . |
| 4,464,900 * | 8/1984 | Bainbridge ........................ 137/843 |
| 4,513,784 | 4/1985 | Farrand et al. . |
| 4,531,543 | 7/1985 | Markley . |
| 4,560,330 | 12/1985 | Murayama et al. . |
| 4,744,737 | 5/1988 | Yamamura et al. . |
| 4,759,696 | 7/1988 | Ishiai . |
| 4,877,382 | 10/1989 | Caillat et al. . |
| 4,904,165 | 2/1990 | Fraser, Jr. et al. . |
| 5,141,420 * | 8/1992 | Nambiar ........................ 418/55.1 |
| 5,267,844 | 12/1993 | Grassbaugh et al. . |
| 5,564,468 * | 10/1996 | Mueller ........................ 137/539 |

FOREIGN PATENT DOCUMENTS 1205135    1/1960   (FR) .

* cited by examiner

Primary Examiner—Thomas Denion
Assistant Examiner—Theresa Trieu
(74) Attorney, Agent, or Firm—Harness, Dickey & Pierce, P.L.C.

(57) ABSTRACT

A compressor assembly includes a shell which defines a discharge chamber. A discharge valve assembly is attached to the shell in communication with the discharge chamber. The discharge valve assembly includes a stamped or coined valve seat, a drawn tubular element and a stamped valve member. The stamping, drawing and coining operations used to manufacture the discharge valve assembly significantly reduce the manufacturing costs for the discharge valve assembly.

4 Claims, 5 Drawing Sheets

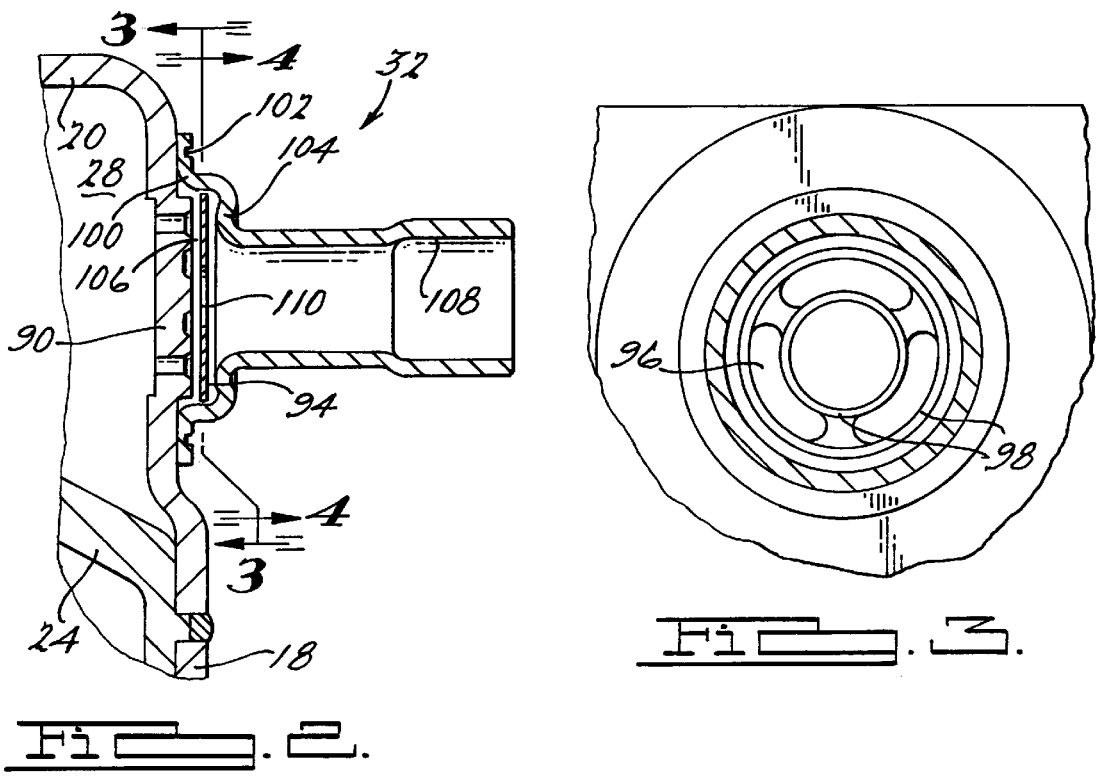
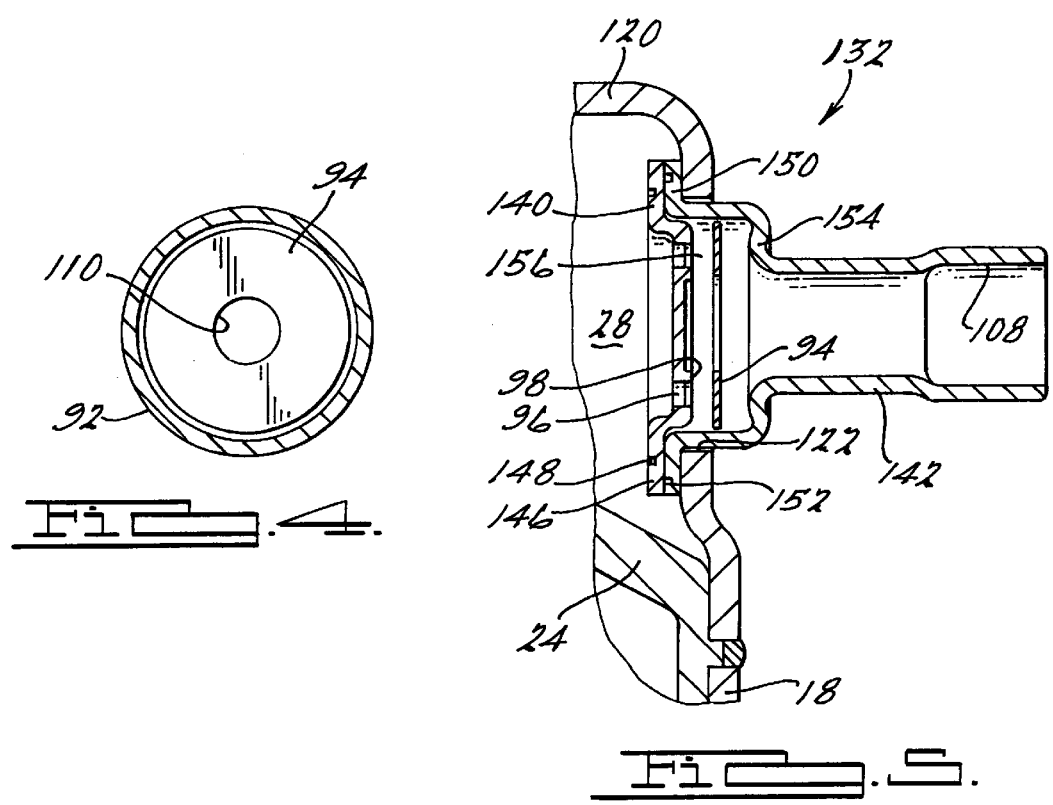

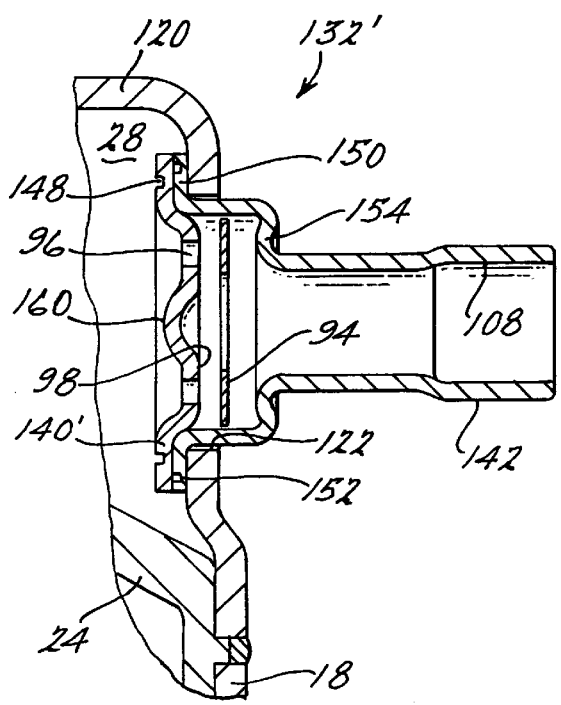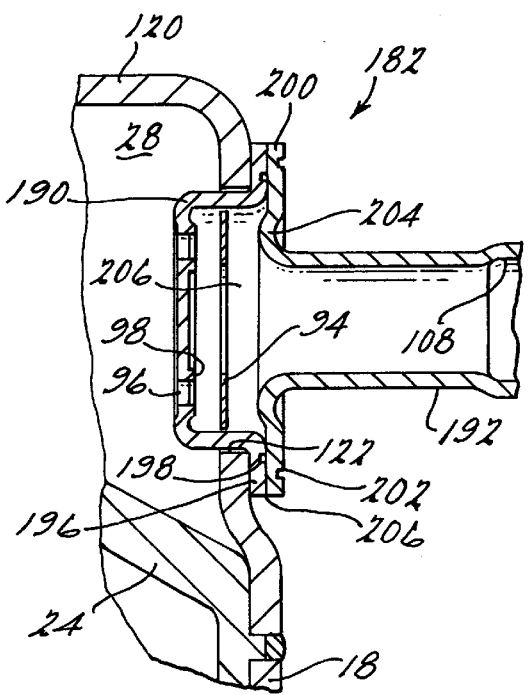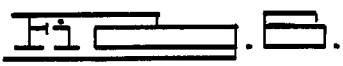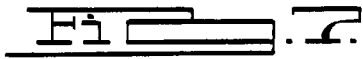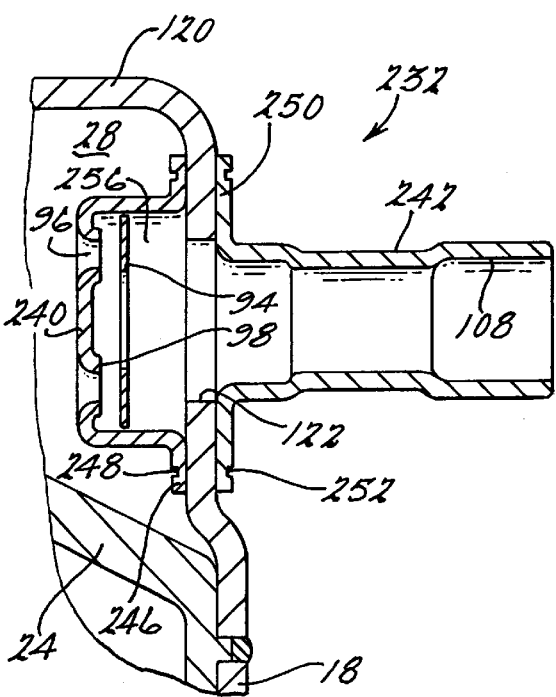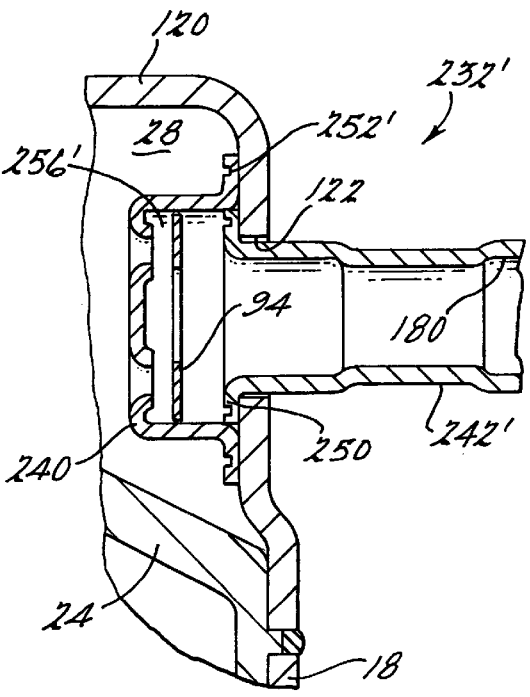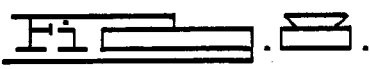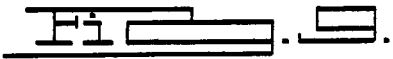

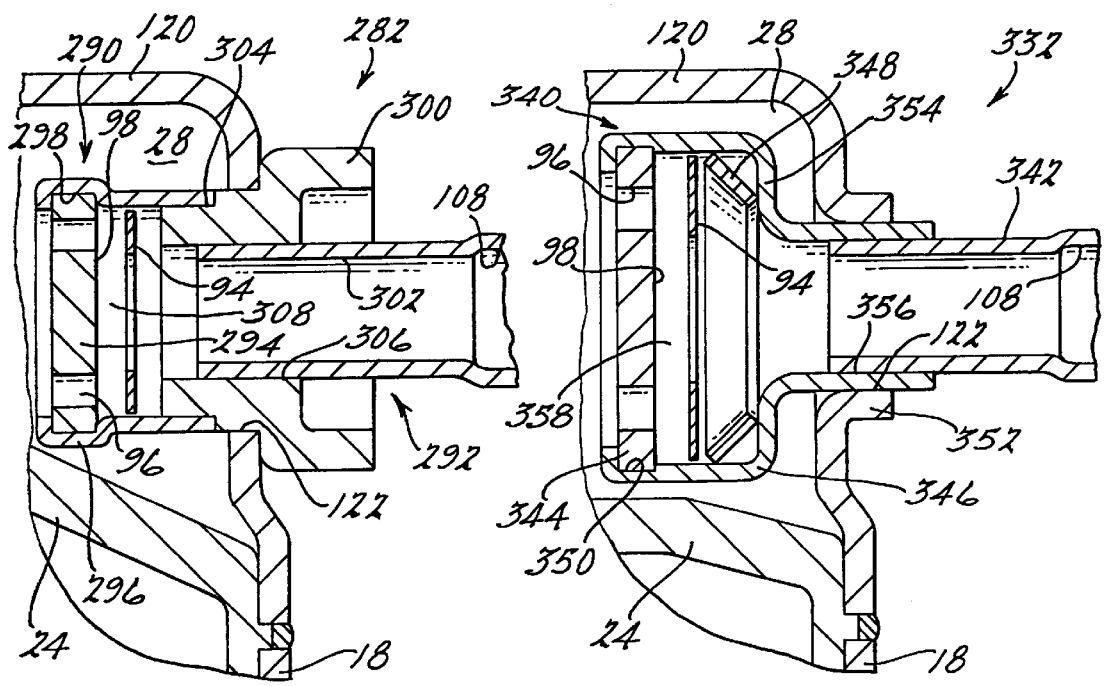
Fig. 10.
Fig. 11.
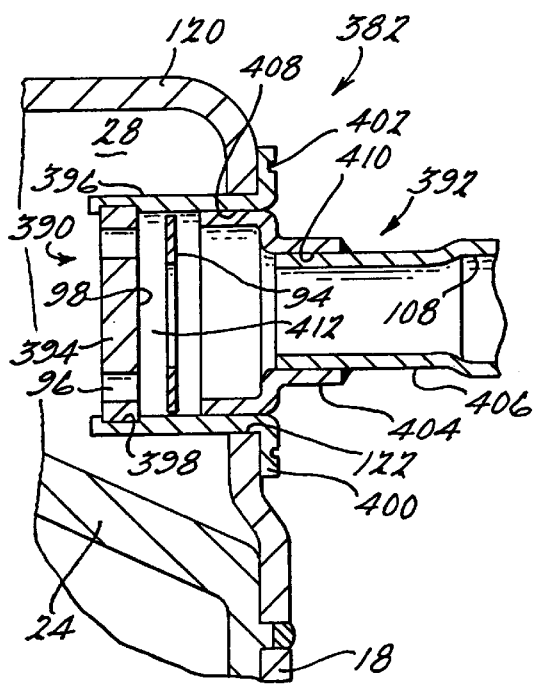
Fig. 12.
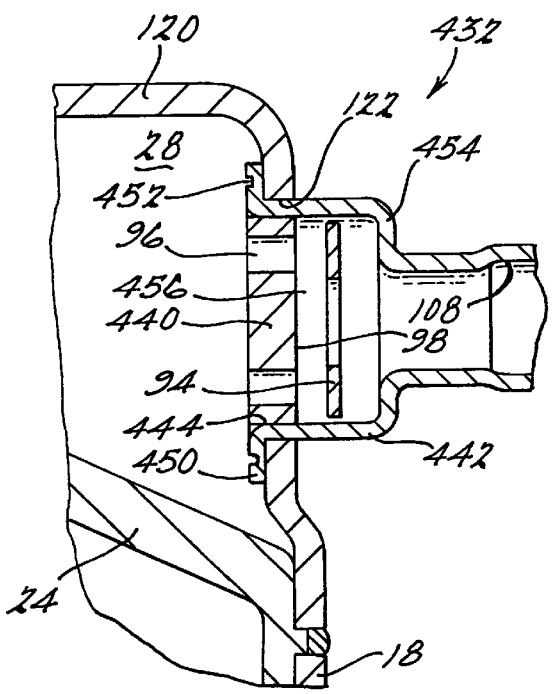
Fig. 13.

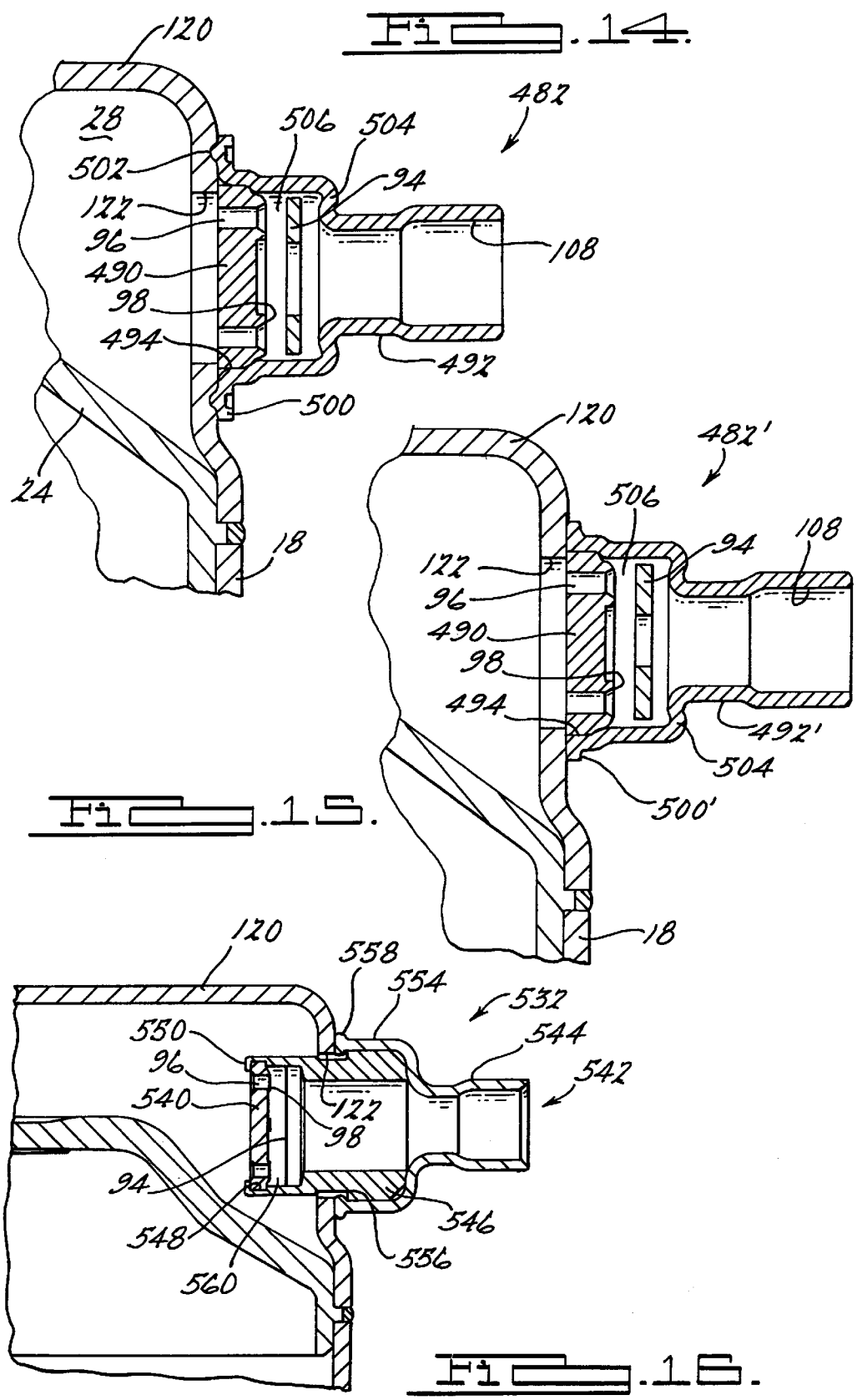

DISCHARGE VALVE

FIELD OF THE INVENTION

The present invention relates generally to discharge valves for compressors.

More particularly, the present invention relates to scroll compressors incorporating discharge valves having stamped valve plates.

BACKGROUND AND SUMMARY OF THE INVENTION

Scroll type machines are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft. Because scroll compressors depend upon a seal created between opposed flank surfaces of the wraps to define successive chambers for compression, suction and discharge valves are generally not required. However, when such compressors are shut down, either intentionally as a result of the demand being satisfied or unintentionally as a result of a power interruption, there is a strong tendency for backflow of compressed gas from the system in combination with high pressure gas contained in the chambers and/or discharge muffler to effect a reverse orbital movement of the orbiting scroll member and associated drive shaft. This reverse movement often generates objectionable noise or rumble. Further, in machines employing a single phase drive motor, it is possible for the compressor to begin running in the reverse direction should a moment a ry power failure be experienced.

In order to limit such reverse rotation, prior art scroll compressors have incorporated ball type check valves at the point of connection between the outer shell and the discharge line. While such ball type check valves have been effective to limit back flow of compressed refrigerant, they have demonstrated a tendency to vibrate or chatter under certain flow conditions thus presenting a further source of objectionable noise. Also, in severe situations, the chattering may result in damage or destruction of the ball stop and/or seat. Additionally, the occasional discharge of liquid through such ball type check valves further increases the possibility of damage thereto.

Other prior art scroll compressors incorporate disc type check valve in the outlet from the outer shell which effectively prevents return flow of compressed gas from the refrigeration system and hence limits reverse orbital movement of the orbiting scroll member. Because reverse orbital movement is thus limited, the possibility of objectionable noise being generated thereby upon shut down of the compressor is greatly reduced. The disc type discharge valve does not require any biasing means but rather operates to create a pressure differential thereacross which moves the disc between seated and unseated positions. The disc type discharge valve provides an inexpensive, easily installed means to effectively resist reverse movement of the orbiting scroll. Further, because a relatively large stop surface area is provided extending around the periphery of the valve member, the possibility of damage from discharge of liquid therethrough is greatly reduced.

While the above described disc valves have performed satisfactorily, the manufacture of the individual components of the disc type check valve required the machining of a housing and the machining or powder metal forming of one or more of the valve components. Both of these forming operations are relatively expensive leading to an increase in the manufacturing costs. The present invention overcomes the problems associated with the relatively expensive forming operations by providing a disc type check valve assembly where all of the components of the check valve assembly are manufactured by using a relatively lower cost stamping process or a powdered metal process. In one embodiment, one of the valve members is integral with the shell of the compressor.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is an enlarged cross section view of the disc type discharge valve assembly shown in FIG. 1;

FIG. 3 is a cross section view of the discharge valve assembly shown in FIG. 2 taken along line 3—3 thereof;

FIG. 4 is a cross section view of the discharge valve assembly shown in FIG. 2 taken along line 4—4 thereof;

FIG. 5 is an enlarged cross section similar to that of FIG. 2 illustrating a disc type discharge assembly in accordance with another embodiment of the present invention;

FIG. 6 is an enlarged cross section similar to that of FIG. 2 illustrating a disc type discharge assembly in accordance with another embodiment of the present invention;

FIG. 7 is an enlarged cross section similar to that of FIG. 2 illustrating a disc type discharge assembly in accordance with another embodiment of the present invention;

FIG. 8 is an enlarged cross section similar to that of FIG. 2 illustrating a disc type discharge assembly in accordance with another embodiment of the present invention;

FIG. 9 is an enlarged cross section similar to that of FIG. 2 illustrating a disc type discharge assembly in accordance with another embodiment of the present invention;

FIG. 10 is an enlarged cross section similar to that of FIG. 2 illustrating a disc type discharge assembly in accordance with another embodiment of the present invention;

FIG. 11 is an enlarged cross section similar to that of FIG. 2 illustrating a disc type discharge assembly in accordance with another embodiment of the present invention;

FIG. 12 is an enlarged cross section similar to that of FIG. 2 illustrating a disc type discharge assembly in accordance with another embodiment of the present invention;

FIG. 13 is an enlarged cross section similar to that of FIG. 2 illustrating a disc type discharge assembly in accordance with another embodiment of the present invention;

FIG. 14 is an enlarged cross section similar to that of FIG. 2 illustrating a disc type discharge assembly in accordance with another embodiment of the present invention;

FIG. 15 is an enlarged cross-section similar to that of FIG. 14 illustrating an alternative welding operation; and FIG. 16 is an enlarged cross section similar to that of FIG. 2 illustrating a disc type discharge assembly in accordance with another embodiment of the present invention.

DETAILED DESCRIPTION OF THE PREFERRED EMBODIMENT

Figure 1:
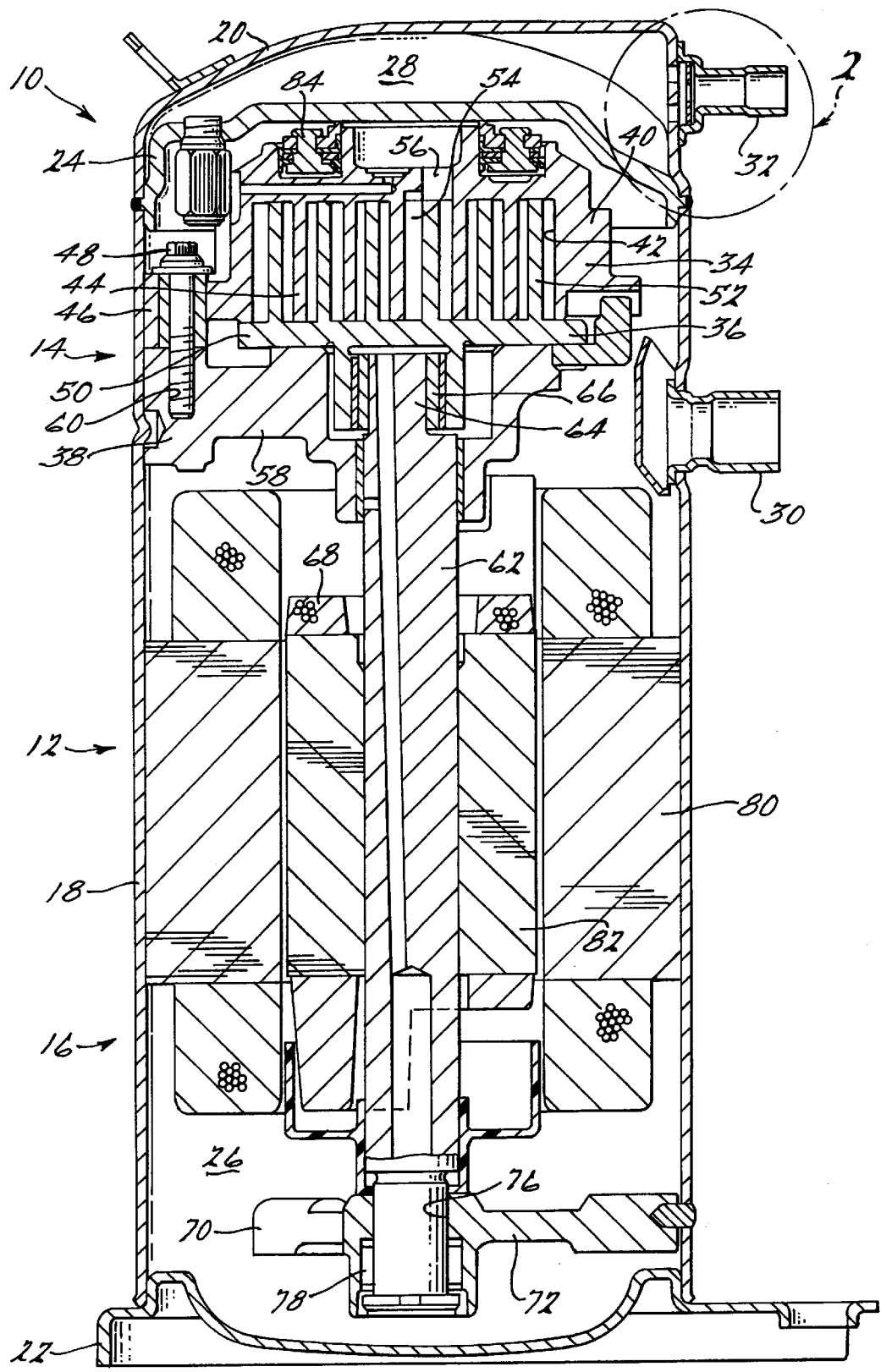
FIG. 1 is a side elevational view, partially in cross section of a hermetically sealed compressor incorporating a disc type discharge valve assembly in accordance with the present invention.

The present invention is illustrated for exemplary purposes in conjunction with a hermetically sealed scroll compressor. It is to be understood that the present invention is not limited to a scroll compressor and that it is possible to use the disc type discharge valve assembly of the present invention on virtually any type of motor compressor or similar machine.

Referring now to the drawings in which like reference numerals designate like or corresponding parts throughout the several views, there is shown in FIG. 1, a scroll compressor including the disc type discharge valve assembly in accordance with the present invention which is designated generally by the reference numeral 10. Compressor 10 is comprised of a hermetic shell assembly 12, a compressor section 14 and a motor drive section 16. Hermetic shell assembly 12 is comprised of a lower shell 18, an upper cap 20, a bottom cover 22 and a partition plate 24. Bottom cover 22, lower shell 18, partition plate 24 and upper cap 20 are fixedly and sealingly attached in the manner shown in FIG. 1 by welding during the assembly of compressor 10 to form a sealed suction chamber 26 and a sealed discharge chamber 28. Hermetic shell assembly 12 further includes a suction inlet fitting 30 in communication with suction chamber 26 and a disc type discharge valve assembly 32 in communication with discharge chamber 28.

Compressor section 14 is comprised of a non-orbiting scroll member 34, an orbiting scroll member 36 and a bearing housing 38. Non-orbiting scroll member 34 includes an end plate and body 40 having a chamber 42 within which is disposed a spiral wrap 44. Non-orbiting scroll member 34 further includes a plurality of embossments 46 which are adapted to be attached to bearing housing 38 by a plurality of bolts 48.

Orbiting scroll member 36 includes an end plate 50 and a spiral wrap 52 which extends upright from end plate 50 into chamber 42. Spiral wrap 52 is meshed with spiral wrap 44 on non-orbiting scroll member 34 in the usual manner to form in combination with bearing housing 38 a portion of compressor section 14 of compressor 10. At least one closed chamber 54 is defined by meshing wraps 44 and 52 with a discharge port 56 formed in the central portion of non-orbiting scroll member 34. Discharge port 56 communicates with discharge chamber 28 formed by partition plate 24 and upper cap 20.

Bearing housing 38 includes a plurality (typically 3 or 4) of radially outwardly extending arms 58 affixed to hermetic shell assembly 12. Arms 58 of bearing housing 38 align with embossments 46 on non-orbiting scroll member 34 and they each include a threaded hole 60 for accepting bolts 48 to attach non-orbiting scroll member 34 to bearing housing 38 as described above.

Compressor section 14 further includes a crankshaft 62 having an eccentric shaft portion 64. Eccentric shaft portion 64 is coupled to orbiting scroll member 36 through a drive bushing and bearing assembly 66. An upper counter balance weight 68 is fixed to crankshaft 62. Crankshaft 62 extends into motor drive section 16 and is supported at its lower end by a lower bearing assembly 70. Lower bearing assembly 70 includes a plurality (typically 3 or 4) of radially outwardly extending arms 72 fixedly secured to shell assembly 12. A central portion of lower bearing assembly 70 includes an elongated bore 76 within which is disposed a journal bearing 78 which receives the lower end of crankshaft 62.

Motor drive section 16 comprises a motor stator 80 and a motor rotor 82. Motor stator 80 is securely mounted within lower shell 18 of shell assembly 12, preferably by press fitting. Motor rotor 82 is coupled to crankshaft 62 and with crankshaft 62 rotates within motor stator 80. Motor stator 80 and motor rotor 82 thus operate to rotate crankshaft 62 to cause orbiting scroll member 36 to orbit with respect to non-orbiting scroll member 34 thereby causing the at least one closed chamber 54 to form at an outer suction port and for chamber 54 to progressively decrease in size as it travels towards center discharge port 56 where it is discharged into discharge chamber 28. A floating seal 84 seals the interface between suction chamber 26 and discharge chamber 28.

The embodiments shown in FIGS. 2–9 illustrate a valve plate which defines a valve seat which has been formed by a powdered metal, a stamping and/or coining process. The coining operation for the valve seat is an inexpensive process which produces a finished planar surface for the valve seat allowing the valve member to sealingly engage the valve seat to prohibit flow of the discharge gas. Thus, a significant cost savings and simplification of the compressor assembly can be achieved by incorporating the coining of the valve seat.

Referring now to FIGS. 2–4, discharge check valve assembly 32 comprises a discharge valve plate 90, an elongated tubular member 92 and a valve member 94. Discharge valve plate 90 is formed as an integral part of upper cap 20 of shell assembly 12 by a stamping and/or coining operation. Valve plate 90 has a plurality (three as shown in FIG. 3) of substantially identical arcuate cutout portions 96 provided therein. A substantially planar surface portion surrounds the plurality of cutout portions 96 to form a valve seat 98 for sealing engagement with valve member 94.

Elongated tubular member 92 has a generally radially outwardly extending annular flange 100 which is adapted to abut and be welded to the outer surface of upper cap 20. In order to aid in the welding process and ensure a secure fluid-tight seal, an annular axially outwardly projecting rib 102 is provided on flange 100. During the welding operation, rib 102 becomes sacrificial to supply a portion of the weld material as is well known in the art. Tubular member 92 can be welded to upper cap 20 by friction welding, resistance welding, laser welding, electron beam welding or any other welding technique know in the art. Tubular member 92 has a generally radially inwardly extending flange 104 which with valve plate 90 forms a chamber 106 within which valve member 94 is located. Flange 104 provides an annular stop surface or shoulder for restricting the movement of valve member 94. The end of tubular member 92 opposite to flange 100 defines an enlarged diameter end 108 which is adapted to be connected to a suitable conduit (not shown) of the refrigeration system with which compressor 10 is to be utilized. Thus, tubular member 92 provides a discharge fluid passage between discharge chamber 28 and the refrigeration system.

Valve member 94 is disposed within chamber 106 and is sized so as to be freely movable between valve seat 98 and flange 104. Valve member 94 has a center opening 110 of substantial diameter through which the compressed fluid is allowed to flow when valve member 94 is spaced from valve seat 98 or when valve member 94 abuts flange 104. When valve member 94 abuts valve seat 98, the diameter of opening 110 is such that fluid communication through the plurality of cutout portions 96 is prohibited.

Preferably, tubular member 92 and valve member 94 are fabricated from sheet metal such as steel whereas valve plate 90 is formed as an integral part of upper cap 20. Tubular member 92 may also be formed from copper or other materials as dictated by the system requirements with which compressor 10 is to be utilized.

In operation, with compressor 10 running, the pressure within discharge chamber 28 will be above the pressure that exists down stream of discharge check valve assembly 32 and thus, the compressed fluid will flow through openings 96 to thereby cause valve member 94 to move towards flange 104, or to an open position, whereby the compressed gas may flow through opening 110 to the refrigeration system. Opening 110 is slightly smaller than the inside diameter of tubular member 92 and thus a pressure differential will exist across valve member 94 which will serve to retain valve member 94 against flange 104 thus preventing the possibility of chattering. When compressor 10 is shut down, the pressure within discharge chamber 28 may decrease below the pressure that exists downstream of valve assembly 32. Under these conditions, the pressure drop across opening 110 in valve member 94 will result in a net force thereon causing valve member 94 to move against valve seat 98 of valve plate 90, or to a closed position, where valve member 94 overlies openings 96 thereby preventing backflow of the compressed gas into discharge chamber 28.

Referring now to FIG. 5, a discharge valve assembly 132 according to another embodiment of the present invention is illustrated. Valve assembly 132 is shown welded to an upper cap 120 having an aperture 122 extending therethrough. Upper cap 120 is interchangeable with upper cap 20 shown in FIGS. 1–4. Valve assembly 132 comprises a discharge valve plate 140, an elongated tubular member 142 and valve member 94. Discharge valve plate 140 is formed as a separate component by a stamping and/or coining operation and has the plurality of cutout portions 96 therein as well as valve seat 98 for sealing engagement with valve member 94. Discharge valve plate 140 has a generally radially outwardly extending annular flange 146 which is adapted to abut and be welded to tubular member 142. In order to aid in the welding process and ensure a secure fluid tight seal, an axially extending rib 148 is provided on flange 146. During the welding operation, rib 148 becomes sacrificial to supply a portion of the weld material as is well known in the art.

Tubular member 142 has a generally radially outwardly extending annular flange 150 which is adapted to abut both annular flange 146 and the inner surface of upper cap 120. Annular flange 150 is also adapted to be welded to the inner surface of upper cap 120. In order to aid in the welding process and ensure a secure fluid tight seal, an axially outwardly projecting rib 152 is provided on flange 150. During the welding operation, rib 152 becomes sacrificial to supply a portion of the weld material as is well know in the art. Rib 152 is shown as being larger in diameter than rib 148. It is within the scope of the present invention to have rib 152 smaller in diameter than rib 148 or to have rib 152 as the same diameter as rib 148 in order to facilitate the welding of valve plate 140 to tubular member 142 and tubular member 142 to the inner surface of upper cap 120. Tubular member 142 has a generally radially inwardly extending flange 154 which with valve plate 140 forms a chamber 156 within which valve member 94 is located. Flange 154 provides an annular stop surface or shoulder for restricting the movement of valve member 94. The end of tubular member 142 opposite to flange 150 defines enlarged diameter end 108 which, as described above, is adapted to be connected to the suitable conduit of the refrigeration system with which compressor 10 is to be utilized.

Valve member 94 is disposed within chamber 156 and is sized so as to be freely movable between valve seat 98 and flange 154. The movement, function and operation of valve member 94 in discharge valve assembly 132 is the same as that described above for the embodiment shown in FIGS. 1–4.

Referring now to FIG. 6, a discharge valve assembly 132' according to another embodiment of the present invention is illustrated. Valve assembly 132' is shown welded to upper cap 120 extending through aperture 122. Valve assembly 132' is similar to valve assembly 132 shown in FIG. 5 except that discharge valve plate 140 has been replaced with discharge valve plate 140'. Discharge valve plate 140' is also formed by a stamping and/or coining operation and is similar to discharge valve plate 140 except that the center portion of valve plate 140' includes a domed contour 160 in place of the generally planar center portion of valve plate 140. Domed contour 160 provides rigidity to valve seat 98 allowing it to maintain its generally planar characteristic and thus improving the sealing relation between valve seat 98 and valve member 94. The function and operation of valve assembly 132' is the same as valve assembly 132 shown in FIG. 5.

Referring now to FIG. 7, a discharge valve assembly 182 according to another embodiment of the present invention is illustrated. Valve assembly 182 is shown welded to upper cap 120 extending out of aperture 122. Valve assembly 182 comprises a discharge valve plate 190, an elongated tubular member 192 and valve member 94. Discharge valve plate 190 is a generally cup shaped plate formed as a separate component by a stamping and/or coining operation and has the plurality of cutout portions 96 therein as well as valve seat 98 for sealing engagement with valve member 94. Discharge valve plate 190 has a generally radially outwardly extending annular flange 196 which is adapted to abut and be welded to the outer surface of upper cap 120. In order to aid in the welding process and ensure a secure fluid tight seal, an axially extending rib 198 is provided on flange 196. During the welding operation, rib 198 becomes sacrificial to supply a portion of the weld material as is well known in the art.

Tubular member 192 has a generally outwardly extending annular flange 200 which is adapted to abut and be welded to annular flange 196 of valve plate 190. In order to aid in the welding process and ensure a secure fluid tight seal, an axially outwardly projecting rib 202 is provided on flange 200. During the welding operation, rib 202 becomes sacrificial to supply a portion of the weld material as is well known in the art. Rib 202 is shown as being larger in diameter than rib 198. It is within the scope of the present invention to have rib 202 smaller in diameter than rib 198 or to have rib 202 the same diameter as rib 198 in order to facilitate the welding the tubular member 192 to valve plate 190 and valve plate 190 to the outer surface of upper cap 120. Tubular member 192 has a generally radially inwardly extending flange 204 which with valve plate 190 forms a chamber 206 within which valve member 94 is located. Flange 204 provides an annular stop surface or shoulder for restricting the movement of valve member 94. The end of tubular member 192 opposite to flange 200 defines enlarged diameter end 108 which, as described above, is adapted to be connected to the suitable conduit of the refrigeration system with which compressor 10 is to be utilized. In order to ensure fluid tightness between valve plate 190 and tubular member 192, a laser welding operation can be performed circumferentially around the seam 206 formed by the mating of valve plate 190 and tubular member 192.

Valve member 94 is disposed within chamber 206 and is sized so as to be readily movable between valve seat 98 and flange 204. The movement, function and operation of valve member 94 in discharge valve assembly 182 is the same as that described above for the embodiment shown in FIGS. 1–4.

Referring now to FIG. 8, a discharge valve assembly 232 according to another embodiment of the present invention is illustrated. Valve assembly 232 is shown welded to upper cap 120 on opposite sides of aperture 122. Valve assembly 232 comprises a discharge valve plate 240, an elongated tubular member 242 and valve member 94. Discharge valve plate 240 is a generally cup shaped plate formed as a separate component by a stamping and/or coining operation and has the plurality of cutout portions 96 therein as well as valve seat 98 for sealing engagement with valve member 94. Discharge valve plate 240 has a generally radially outwardly extending annular flange 246 which is adapted to abut and be welded to the inner surface of upper cap 120. In order to aid in the welding process and ensure a secure fluid tight seal, an axially extending rib 248 is provided on flange 246. During the welding operation, rib 248 becomes sacrificial to supply a portion of the weld material as is well known in the art.

Tubular member 242 has a generally outwardly extending annular flange 250 which is adapted to abut and be welded to the outer surface of upper cap 120. In order to aid in the welding process and ensure a secure fluid tight sea, an axially outwardly projecting rib 252 is provided on flange 250. During the welding operation, rib 252 becomes sacrificial to supply a portion of the weld material as is well known in the art. The end of tubular member 242 opposite to flange 250 defines enlarged diameter end 108 which, as described above, is adapted to be connected to the suitable conduit of the refrigeration system with which compressor 10 is to be utilized.

Valve member 94 is disposed within a chamber 256 formed by valve plate 240 and upper cap 120. Upper cap 120 provides an annular stop surface or shoulder for restricting the movement of valve member 94. Valve member 94 is sized so as to be freely movable between valve seat 98 and upper cap 120. The movement function and operation of valve member 94 in discharge valve assembly 232 is the same as that described above for the embodiment shown in FIGS. 1–4.

Referring now to FIG. 9, a discharge valve assembly 232' according to another embodiment of the present invention is illustrated. Valve assembly 232' is shown welded to upper cap 120 extending through aperture 122. Valve assembly 232' is similar to valve assembly 232 shown in FIG. 8 except that tubular member 242 has been replaced with tubular member 242'. Tubular member 242' is similar to tubular member 242 except that annular flange 250 and rib 252 have been replaced with annular flange 250' and rib 252'. Annular flange 250' is adapted to abut and be welded to the inner surface of upper cap 120 radially inward of valve plate 240. Rib 252' aids in the welding process to ensure a secure fluid type seal. During the welding operation, rib 252' becomes sacrificial to supply a portion of the weld material as is well know in the art. Valve member 94 is disposed within a chamber 256' formed by valve plate 240 and tubular member 242'. Flange 250' of tubular member 242' provides an annular stop surface or shoulder for restricting the movement of valve member 94. Valve member 94 is sized so as to be freely movable between valve seat 98 and flange 250'. The movement, function and operation of valve member 94 in discharge valve assembly 232' is the same as that described above for the embodiment shown in FIGS. 1–4.

Referring now to FIG. 10, a discharge valve assembly 282 according to another embodiment of the present invention is illustrated. Valve assembly 282 is shown welded to upper cap 120 extending through aperture 122. Discharge valve assembly 282 comprises a discharge valve plate assembly 290, a tubular member 292 and valve member 94. Discharge valve plate assembly 290 comprises a discharge valve plate 294 and a tubular element 296. Valve plate 294 is formed preferably from powdered metal and has the plurality of cutout portions 96 therein as well as valve seat 98. Valve plate 294 is secured to tubular element 296 by a forming operation which sandwiches valve plate 294 within an annular groove 298 of tubular element 296. Tubular element 296 is secured to tubular element 292 by a brazing operation.

Tubular member 292 comprises a steel drawn tubular fitting 300 and a tubular element 302. Steel fitting 300 is preferably friction welded to upper cap 120 to provide a secure fluid tight seal. Steel drawn fitting 300 includes a reduced diameter portion 304 upon which tubular element 296 of valve plate assembly 290 is brazed. Reduced diameter portion 304 provides an annular stop surface or shoulder for restricting the movement of valve member 94. Tubular element 302 is brazed to an internal diameter 306 of fitting 300. The end of tubular element 302 opposite to fitting 300 defines enlarged diameter end 108 which, as described above, is adapted to be connected to the suitable conduit of the refrigeration system with which compressor 10 is to be utilized.

Valve member 94 is disposed within a chamber 308 formed by valve plate assembly 290 and tubular member 292. Valve member 94 is sized so as to be freely movable between valve seat 98 and fitting 300. The movement, function and operation of valve member 94 in discharge valve assembly 282 is the same as that described above for the embodiment shown in FIGS. 1–4.

Referring now to FIG. 11, a discharge valve assembly 332 according to another embodiment of the present invention is illustrated. Valve assembly 332 is shown welded to upper cap 120 extending through aperture 122. Discharge valve assembly 332 comprises a discharge valve plate assembly 340, a tubular element 342 and valve member 94. Discharge valve plate assembly 340 comprises a discharge valve plate 344, a cup shaped tubular fitting 346 and a stop 348. Valve plate 344 is formed preferably from powdered metal and has the plurality of cutout portions 96 therein as well as valve seat 98. Valve plate 344 is secured to tubular fitting 346 by a forming operation which sandwiches valve plate 344 within an annular groove 350 of tubular fitting 346. Tubular fitting 346 and thus valve assembly 332 is secured to upper cap 120 by being brazed to a formed flange 352 extending from upper cap 120 surrounding aperture 122. Stop 348 is a frusto-conical element which is brazed within tubular fitting 346 abutting an inwardly radially extending flange 354 of tubular fitting 346 to form an annular stop surface or shoulder for restricting the movement of valve member 94.

Tubular element 342 is brazed to an internal diameter 356 of tubular fitting 346. The end of tubular element 342 opposite to fitting 346 defines enlarged diameter end 108 which, as described above, is adapted to be connected to the suitable conduit of the refrigeration system with which compressor 10 is to be utilized.

Valve member 94 is disposed within a chamber 358 formed by valve plate assembly 340. Valve member 94 is sized so as to be freely movable between valve seat 98 and stop 348. The movement, function and operation of valve member 94 in discharge valve assembly 332 is the same as that described above for the embodiment shown in FIGS. 1–4.

Referring now to FIG. 12, a discharge valve assembly 382 according to another embodiment of the present invention is illustrated. Valve assembly 382 is shown welded to upper cap 120 extending through aperture 122. Discharge valve assembly 382 comprises a valve plate assembly 390, a tubular element 392 and a valve member 94. Discharge valve plate assembly 390 comprises a discharge valve plate 394 and a tubular fitting 396. Valve plate 394 is formed preferably from powdered metal and has the plurality of cutout portions 96 therein as well as valve seat 98. Valve plate 394 is secured to tubular fitting 396 by a forming operation which sandwiches valve plate 394 within an annular groove 398 of tubular fitting 396. Tubular fitting 396 has a generally radially outwardly extending annular flange 400 which is adapted to abut and be welded to the outer surface of upper cap 120. In order to aid in the weld process and ensure a secure fluid tight seal, an axially extending rib 402 is provided on flange 400. During the welding operation, rib 402 becomes sacrificial to supply a portion of the weld material as is well known in the art.

Tubular element 392 comprises a tubular fitting 404 and a tube 406. Tubular fitting 404 is brazed to an internal diameter 408 of tubular fitting 396. The end of tubular fitting 404 extending within tubular fitting 396 forms an annular stop surface or shoulder for restricting the movement of valve member 94. Tube 406 is brazed to an internal diameter 410 of fitting 404. The end of tube 406 opposite to fitting 404 defines enlarged diameter end 108 which, as described above, is adapted to be connected to the suitable conduit of the refrigeration system with which compressor 10 is to be utilized.

Valve member 94 is disposed within a chamber 412 formed by valve plate assembly 390 and tubular element 392. Valve member 94 is sized so as to be freely movable between valve seat 98 and tubular fitting 404. The movement, function and operation of valve member 94 in discharge valve assembly 382 is the same as that described above for the embodiment shown in FIGS. 1–4.

Referring now to FIG. 13, a discharge valve assembly 432 according to another embodiment of the present invention is illustrated. Valve assembly 432 is shown welded to upper cap 120 extending out of aperture 122. Valve assembly 432 comprises a discharge valve plate 440, an elongated tubular member 442 and valve member 94. Discharge valve plate 440 is formed preferably from powdered metal and has the plurality of cutout portions 96 therein as well as valve seat 98. Valve plate 440 is secured to tubular member 442 by being welded or brazed to an internal diameter 444 of tubular member 442.

Tubular member 442 has a generally outwardly extending annular flange 450 which is adapted to abut and be welded to the inside surface of upper cap 120. In order to aid in the welding process and ensure a secure fluid tight seal, an outwardly projecting rib 452 is provided on flange 450. During the welding operation, rib 452 becomes sacrificial to supply a portion of the weld material as is well known in the art. Tubular member 442 has a generally radially inwardly extending flange 454 which with valve plate 440 forms a chamber 456 within which valve member 94 is located. Flange 454 provides an annular stop surface or shoulder for restricting the movement of valve member 94. The end of tubular member 442 opposite to flange 450 defines enlarged diameter end 108 which, as described above, is adapted to be connected to the suitable conduit of the refrigeration system with which compressor 10 is to be utilized.

Valve member 94 is disposed within chamber 456 and is sized so as to be freely movable between valve seat 98 and flange 454. The movement, function and operation of valve member 94 in discharge valve assembly 432 is the same as that described above for the embodiment shown in FIGS. 1–4.

Referring now to FIG. 14, a discharge valve assembly 482 according to another embodiment of the present invention is illustrated. Valve assembly 482 is shown welded to upper cap 120 adjacent to aperture 122. Valve assembly 482 comprises a discharge valve plate 490, an elongated tubular member 492 and valve member 94. Discharge valve plate 490 is formed preferably from powdered metal and has the plurality of cutout portions 96 therein as well as valve seat 98. Valve plate 490 is secured to tubular member 492 by being welded or brazed to an internal diameter 494 of tubular member 492.

Tubular member 492 has a generally outwardly extending annular flange 500 which is adapted to abut and be welded to the outside surface of upper cap 120. In order to aid in the welding process and ensure a secure fluid tight seal, an outwardly projecting rib 502 is provided on flange 500. During the welding operation, rib 502 becomes sacrificial to supply a portion of the weld material as is well known in the art. Tubular member 492 has a generally radially inwardly extending flange 504 which with valve plate 490 forms a chamber 506 within which valve member 94 is located. Flange 504 provides an annular stop surface or shoulder for restricting the movement of valve member 94. The end of tubular member 492 opposite to flange 500 defines enlarged diameter end 108 which, as described above, is adapted to be connected to the suitable conduit of the refrigeration system with which compressor 10 is to be utilized.

Valve member 94 is disposed within chamber 506 and is sized so as to be freely movable between valve seat 98 and flange 504. The movement, function and operation of valve member 94 in discharge valve assembly 482 is the same as that described above for the embodiment shown in FIGS. 1–4.

Referring now to FIG. 15, a discharge valve assembly 482' according to another embodiment of the present invention is illustrated. Valve assembly 482' is the same as valve assembly 482 except that elongated tubular member 492 of valve assembly 482 is replaced by tubular member 492' of valve assembly 482'. Tubular member 492' is the same as tubular member 492 except that the enlarged portion of tubular member 492' adjacent upper cap 120 is modified for friction welding to upper cap 120 as is well known in the art. During the welding operation, the enlarged end of tubular member 492' adjacent upper cap 120 is curled over to form flange 500' as is also well know in the art. The function and operation of valve assembly 482' is the same as that described above for valve assembly 482.

Referring now to FIG. 16, a discharge valve assembly 532 according to another embodiment of the present invention is illustrated. Valve assembly 532 is shown friction-welded to upper cap 120 extending through aperture 122. Discharge valve assembly 532 comprises a discharge valve plate 540, a tubular member 542 and valve member 94. Tubular member 542 includes a tubular fitting 544 and a valve body 546. Valve plate 540 is preferably formed from powdered metal and has the plurality of cutout portions 96 therein as well as valve seat 98. Valve plate 540 is secured to valve body 546 by an orbit-forming operation which sandwiches valve plate 540 within an annular groove 548 of valve body 546. Before forming, valve body 546 includes an annular extension which extends beyond the outer edge of valve plate 540. The annular extension is formed over the outside end of valve plate 540 to create a flange 550 which retains valve plate 540 within valve body 546 similar to the manner shown in previous embodiments.

Tubular fitting 544 is designed to be friction welded to upper cap 120. Prior to the friction welding operation, valve body 546 is pressed into an enlarged portion 554 of tubular fitting 544. Valve body 546 can be pressed into tubular fitting 544 before or after the assembly of valve plate 540 but preferably it is done before. The open end of enlarged portion 554 of tubular fitting 544 extends beyond a shoulder 556 formed on valve body 546 such that only enlarged portion 554 of tubular fitting 544 contacts upper cap 120 before the welding operation. The open end is modified for friction-welding as is well known in the art. During the welding operation, the open end of enlarged portion 554 is curled over to form a flange 558 as is also known well in the art. The portion of flange 558 which extends into enlarged portion 554 retains valve body 546 within fitting 544.

Valve member 94 is disposed within a chamber 560 formed by valve plate 540 and valve body 546. Valve member 94 is sized so as to be freely movable between valve seat 98 on valve plate 540 and valve body 546 which acts as a stop for valve member 94. The movement function and operation of valve member 94 in discharge valve assembly 532 is the same as described above for the embodiment shown in FIGS. 1–4.

While the above detailed description describes the preferred embodiment of the present invention, it should be understood that the present invention is susceptible to modification, variation and alteration without deviating from the scope and fair meaning of the subjoined claims.

What is claimed is:

1. A compressor assembly comprising:
    a shell defining a discharge chamber;
    a compressor disposed within said shell, said compressor compressing a fluid from a suction pressure to a discharge pressure, fluid at said discharge pressure being directed to said discharge chamber;
    a discharge valve assembly attached to said shell in communication with said discharge chamber, said discharge valve assembly comprising:
        a valve seat unitarily formed with said shell;
        a tubular member secured directly to said shell;
        a stop secured to shell, said stop and said valve seat defining a valve chamber;
        a valve member disposed in said valve chamber, said valve member being movable between a closed position where said valve member abuts said valve seat and an open position where said valve member abuts said stop.

2. The compressor assembly according to claim 1 wherein, said stop is unitarily formed with said tubular member.

3. A compressor assembly comprising:
    a shell defining a discharge chamber;
    a compressor disposed within said shell, said compressor compressing a fluid from a suction pressure to a discharge pressure, fluid at said discharge pressure being directed to said discharge chamber;
    a discharge valve assembly attached to said shell in communication with said discharge chamber, said discharge valve assembly comprising:
        a valve seat secured to said shell;
        a tubular member secured to said shell;
        a stop secured to shell, said stop being unitarily formed with said tubular member, said stop and said valve seat defining a valve chamber;
        a valve member disposed in said valve chamber, said valve member being movable between a closed position where said valve member abuts said valve seat and an open position where said valve member abuts said stop.

4. The compressor assembly according to claim 3 wherein, said valve seat and said tubular member are attached to an inside surface of said shell.

* * * * *

UNITED STATES PATENT AND TRADEMARK OFFICE
CERTIFICATE OF CORRECTION

PATENT NO.    : 6,171,084 B1
DATED         : January 9, 2001
INVENTOR(S)   : Frank S. Wallis et al It is certified that error appears in the above-identified patent and that said Letters Patent is hereby corrected as shown below:

Column 1,
Line 37, "moment a ry" should be -- momentary --.

Column 6,
Line 51, after "welding" insert -- of --.

Column 7,
Line 25, "sea" should be -- seal --.
Line 55, "type" should be -- tight --.
Lien 57, "know" should be -- known --.

Column 8,
Line 25, after "to" insert -- be --.

Column 10,
Line 50, "know" should be -- known --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*